United States Patent [19]
Kiehn

[11] 3,949,842
[45] Apr. 13, 1976

[54] FREE FALL SAFETY DEVICE

[76] Inventor: Mogens Kiehn, 310 Melvin, Northbrook, Ill. 60062

[22] Filed: Apr. 3, 1975

[21] Appl. No.: 564,632

[52] U.S. Cl. .................. 188/189; 240/64; 248/320
[51] Int. Cl.² ........................................ F16D 59/02
[58] Field of Search ............ 188/44, 65.4, 184, 189; 187/87, 88; 240/64, 70; 248/320; 254/148

[56] References Cited
UNITED STATES PATENTS

| 604,557 | 5/1898 | Baum | 188/189 UX |
| 3,579,910 | 5/1971 | Wetter | 188/189 X |
| 3,805,054 | 4/1974 | Wolf | 240/70 |

*Primary Examiner*—Duane A. Reger
*Attorney, Agent, or Firm*—Bruce K. Thomas

[57] ABSTRACT

A device to prevent the light-channel ring and lighting fixtures of high mast lighting installations from falling in the event of failure of the main hoisting cable or in the event of failure or inadvertent release of the releasable supporting means at the top of the mast. During normal hoisting operations the device is held in a closed or released position by the applied hoisting forces and opens or locks when the light-channel ring is locked in place at the top of the mast for double security. If the load should be released through failure or interruption of the hoisting cable, the device opens and locking arms expand therefrom and contact the tapered inside wall of the mast to instantly lock the cable assembly at any position therealong. A spring-loaded pin and ratchet prevent the arms from retracting once they are released, thus preventing advance of the device into portions of the mast of smaller diameter.

17 Claims, 22 Drawing Figures

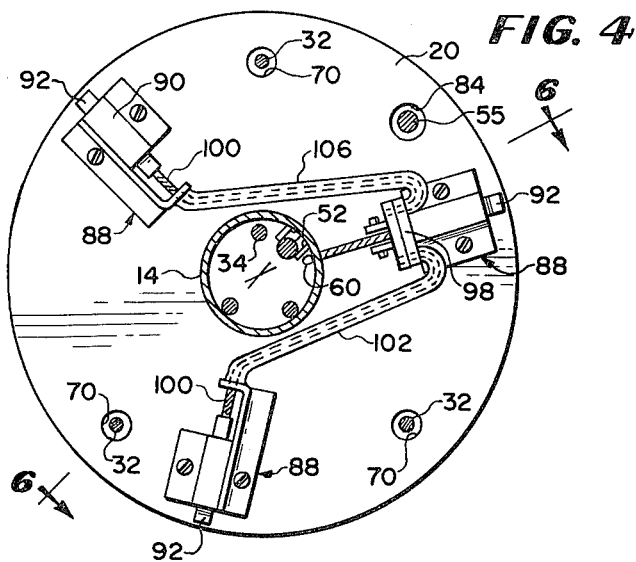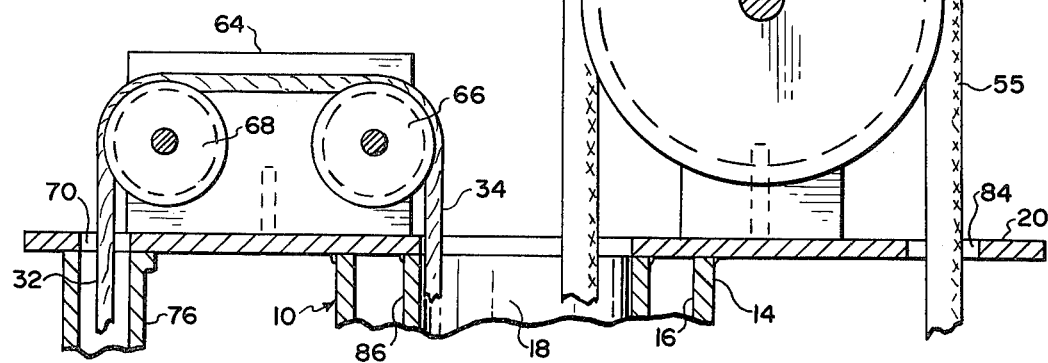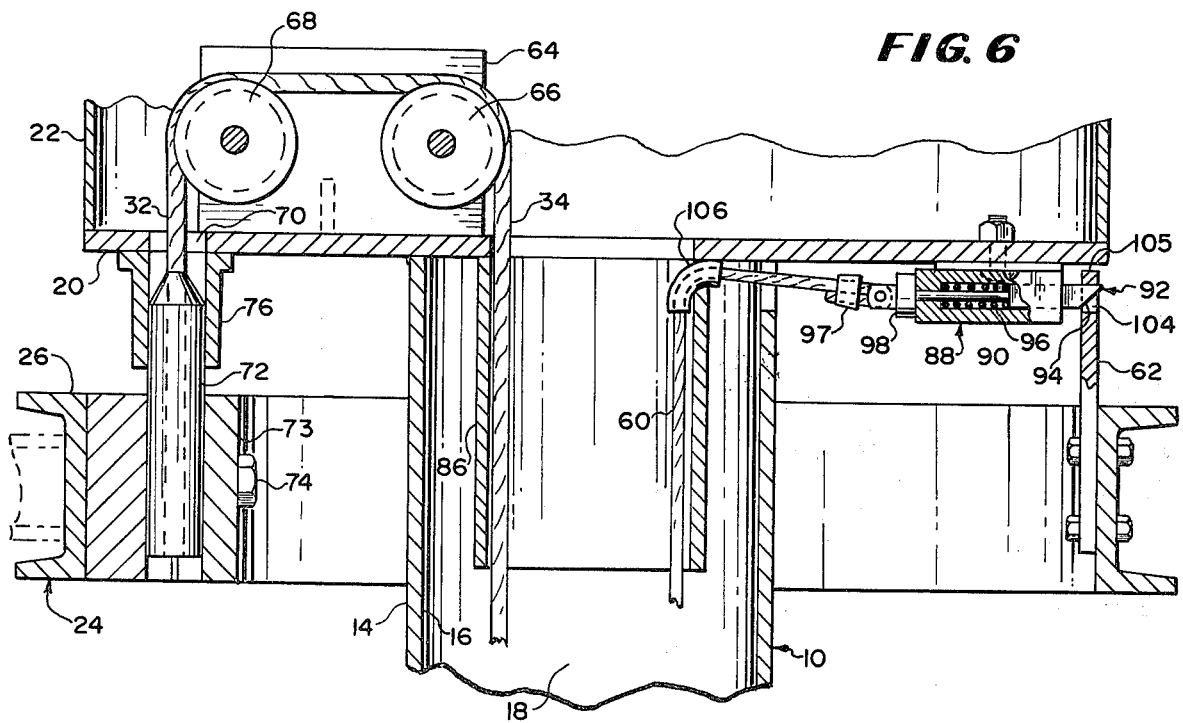

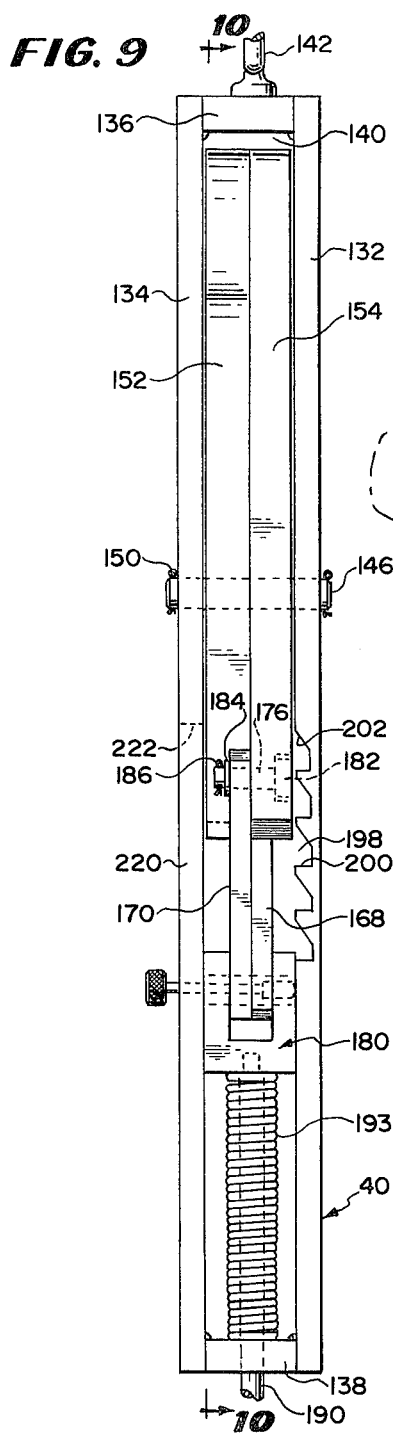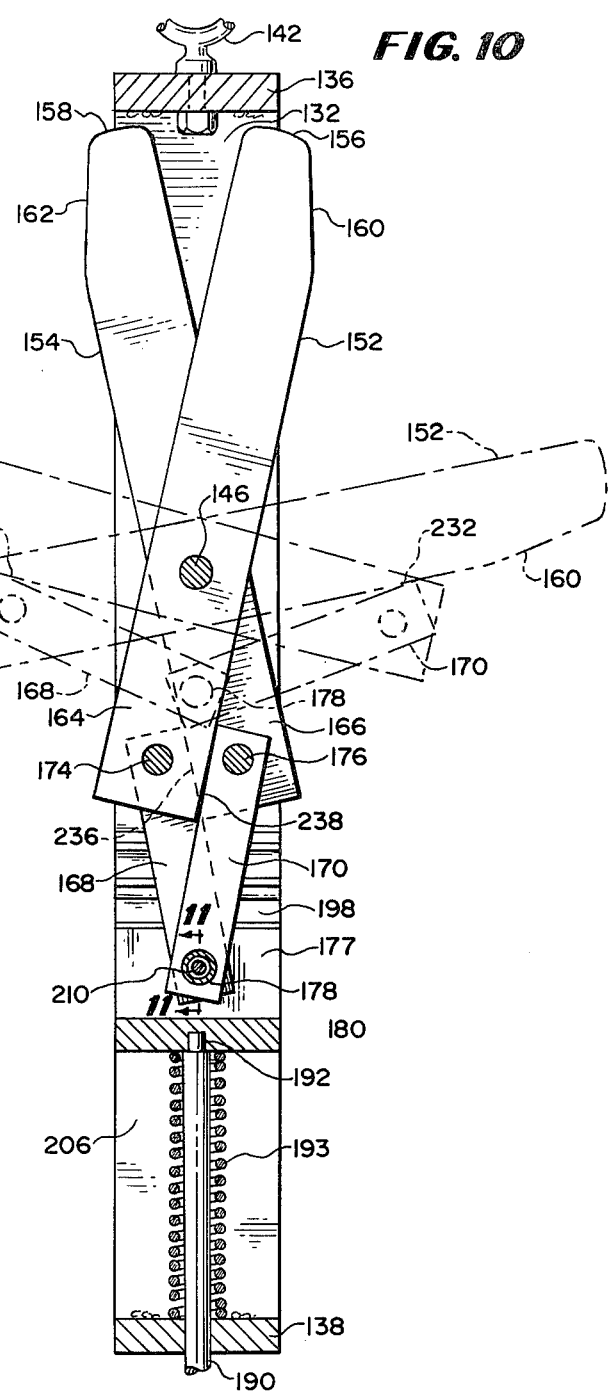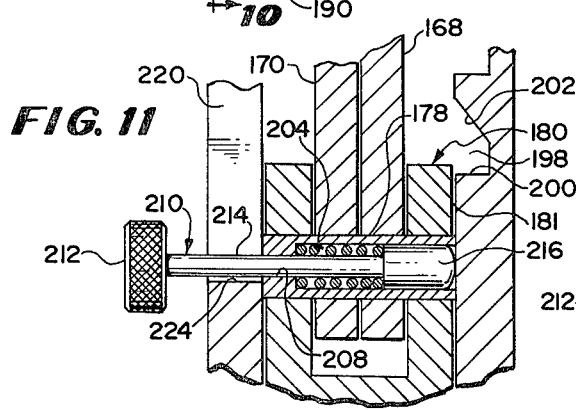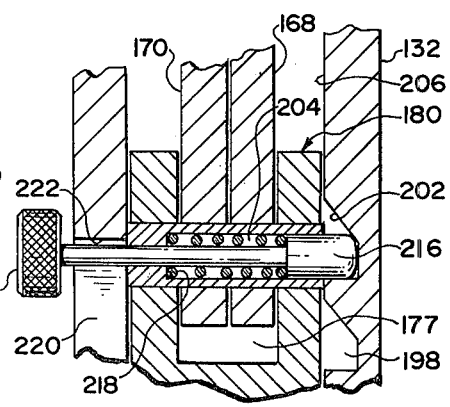

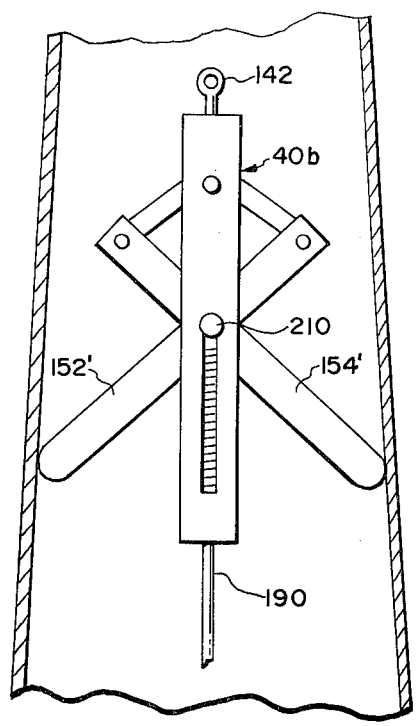
FIG. 17
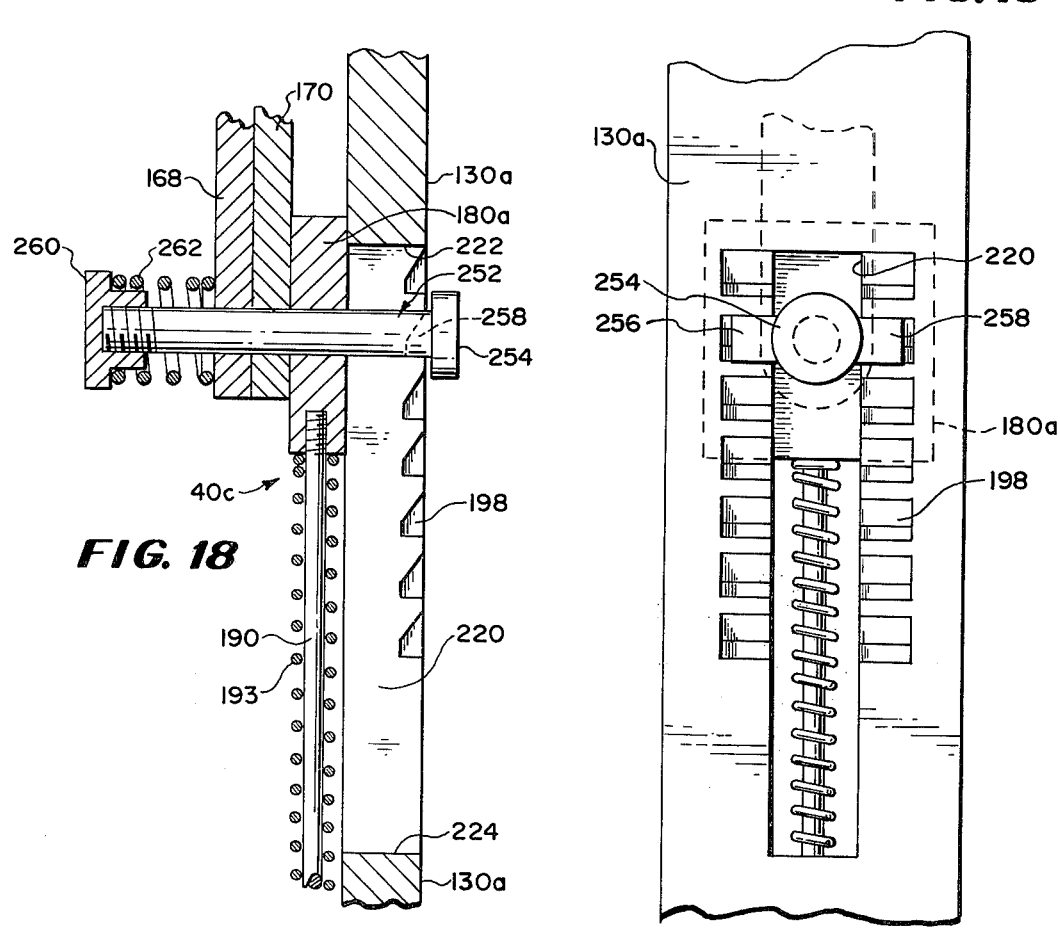
FIG. 18
FIG. 19

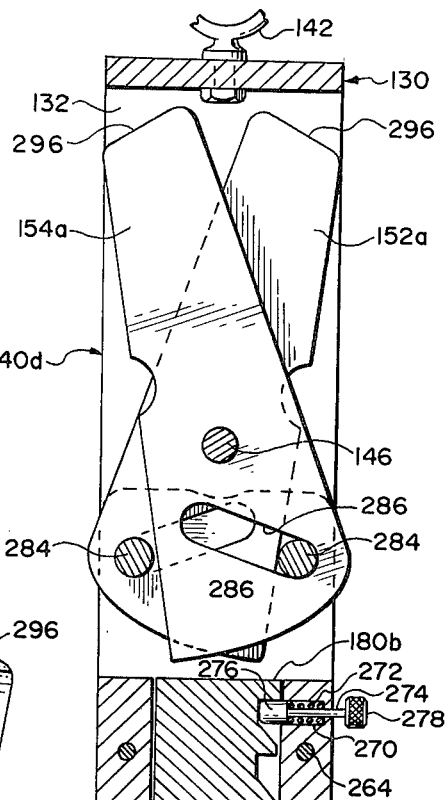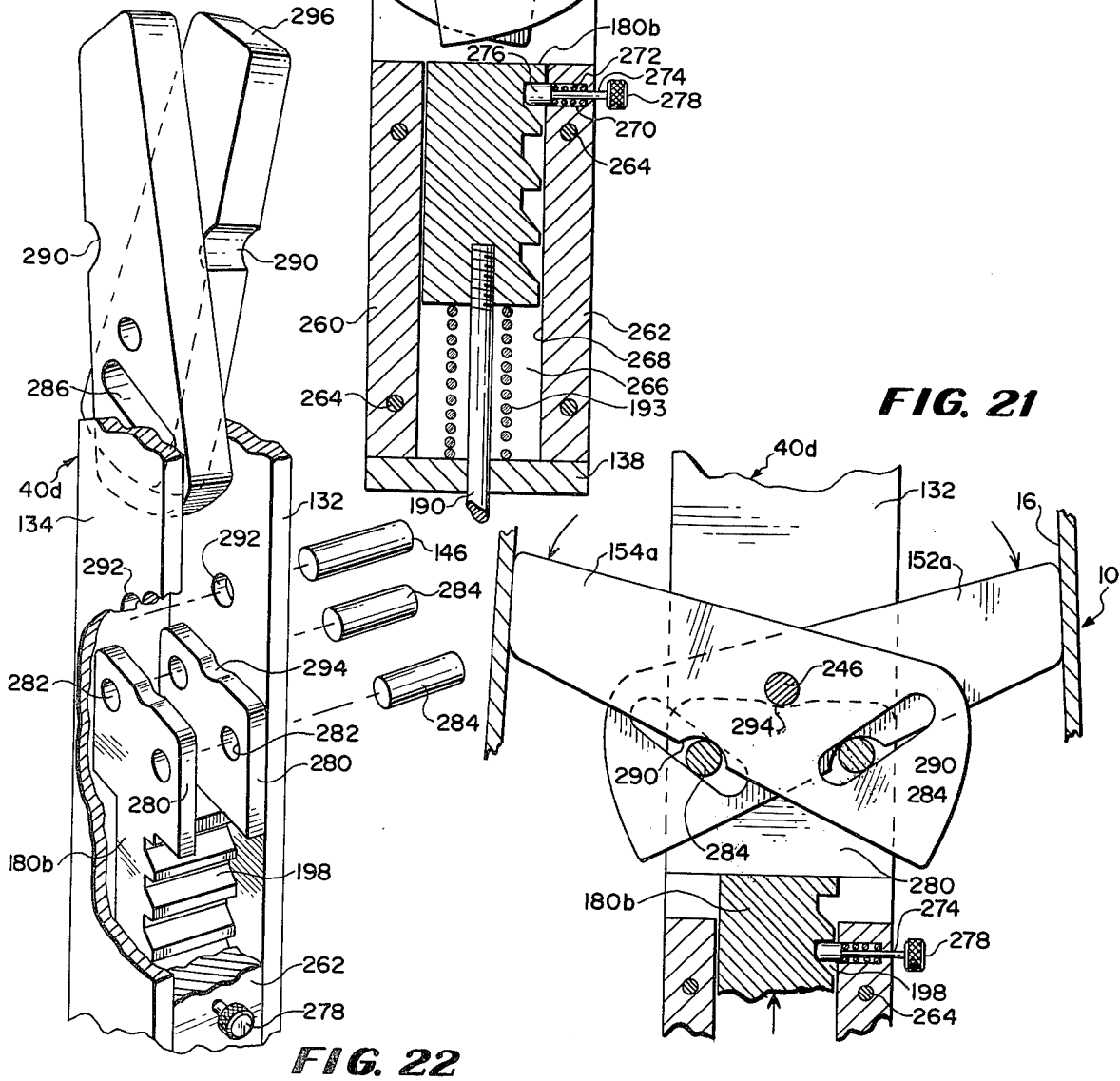

FREE FALL SAFETY DEVICE

BACKGROUND OF THE INVENTION

The use of high mast lighting has out-paced the requirements and development of necessary and proper safety features. Most of the raising and lowering devices used in conjunction with high mast lighting may be restrained, braked, locked or otherwise secured in the raised and lowered positions. These raising and lowering devices do not however provide adequate safety during the course of raising and lowering the increasingly heavy carrying rings and lighting fixtures, nor do they provide safety under static conditions.

High mast lighting fixtures are variously suspended and controlled from the three cables that are affixed thereto and pass over capstan arrangements at the top of the mast and extend downwardly inside the mast for attachment to anchoring means of some kind. When the lighting fixtures are to be lowered for cleaning, repair or replacement it is necessary to manipulate the anchoring means so that a braking force can be applied as the lighting fixtures are lowered. Following the maintenance procedure, the lighting fixtures must be raised to the top of the mast and the system secured against tampering and accidental release.

In U.S. Pat. No. 3,696,241, a tower and support for high mast lighting fixtures is disclosed which employs an elongated counter-weight at the cable ends inside the tower, much like the counter-weight used in elevators. A power winch is employed for use with a lift cable running over a sheave mounted in the top of the tower and back to the counter-weight. The power winch raises and lowers the counter-weight and the lighting fixtures as desired. No safety provisions are provided and failure of the power winch or supporting cables can present a dangerous situation for the workmen. A similar system is described in U.S. Pat. No. 3,686,498 wherein the counter-weight is not permanently attached to the cable system and is detached during raising and lowering of the lighting fixtures. Here again safety depends on the power winch device.

U.S. Pat. No. 3,801,813, by the instant inventor, discloses a combination mast and light fixture raising and lowering apparatus wherein the supporting cables pass over capstans at the top of the mast and downward through the mast to a windless apparatus at the bottom thereof for raising and lowering the lighting fixtures that are affixed to the luminaire ring encircling the top of the mast. Releasable support means are provided adjacent the upper portion of the mast to engage the luminaire ring and support the weight of the lighting fixtures in their raised position. The releasable support means are out of reach of vandals. Signalling means are also provided to tell the operator below when the light carrying unit is in its proper locked position at the upper part of the mast. The releasable support means is controlled by a release cable that extends to the bottom of the mast and is secured inside the base.

SUMMARY OF THE INVENTION

This invention is an improvement on the combination of raising and lowering apparatus disclosed in my U.S. Pat. No. 3,801,813 to provide a fail safe suspension for the lighting fixtures designed to operate inside the tapered tubular mast which by failure of the main hoisting cable without relying on spring tensions or mechanical latches in its main function. The safety device of this invention will not activate during normal operation and the jostling that is experienced in operating a winch arrangement and is self energizing through part of the range of total travel. Also, the safety device of this invention is adaptable to poles or masts having minimum diameters of about 4½ inches.

More particularly, the free fall safety device of this invention comprises mechanical locking arms secured to a spring-biased actuating means, both of which are housed within an elongated body of relatively small diameter. The actuating rod at its lower end attaches to the main hoisting cable for use during raising and lowering operations. The actuating means which can be in the form of a piston follower, constantly urges the mechanical locking arms radially outward into locking contact with the inside tapered wall of the mast at any position therealong. The working load during normal operation, when the top releasable support means for the luminaire ring is released, is transferred (top to bottom) from the housing to the mechanical arms, to the actuating means, and hence through the rod to the hoisting cable. This retracts the mechanical arms during raising and lowering. Any power or cable failure causing sudden or gradual release of the pulling force, automatically releases the mechanical arms into their locked position against the inside tapered wall of the mast and stops the descent of the lighting assembly almost before it begins. A shock absorber is also provided for the supporting cable assembly to prevent snapping of the cables or shearing of attaching parts. A biased catch member is incorporated in the actuating means which is operable to prevent the retraction of the mechanical arms, once they are released or otherwise forced by the actuating means to their extended and locked position with the tubular wall, thus preventing advance of the safety device upwardly into wall portions of smaller diameter. During these periods when the luminaire ring is in the lighting position at the top of the mast, the safety device is activated and prevents free fall of the lighting fixtures as a double safety provision.

DESCRIPTION OF THE DRAWINGS

Illustrative embodiments of the invention are shown in the drawings wherein:

FIG. 4 is a horizontal sectional view through the mast of FIG. 1, just below the pulley containing enclosure taken along section line 4—4 therein;

FIG. 5 is a vertical sectional view taken along section line 5—5 in FIG. 3;

FIG. 6 is a vertical sectional view taken along section line 6—6 in FIG. 4 after the light carrying unit has been raised to its normal lighting position on the mast;

FIG. 9 is a side plan view of the free full device in the position shown in FIG. 8;

FIG. 10 is a cross-sectional view of the free fall device, taken along the line 10—10 of FIG. 9 with the device in the position shown in FIGS. 8 and 9 and the locked position of FIG. 7 being shown in broken lines;

FIG. 11 is an enlarged fragmentary view of the catch member taken along the lines 11—11 of FIG. 10;

FIG. 12 is an enlarged view like that of FIG. 11 with the catch member in the locked position as it would be with the locking arms extended as in FIG. 7;

FIG. 17 is a fragmentary view of the bottom of the mast showing the free fall device of FIG. 16 used in an up-side-down position;

FIG. 18 is a fragmentary cross-sectional view of a modified free fall device and latch arrangement;

FIG. 19 is a fragmentary plan view of the embodiment of FIG. 18;

FIG. 20 is a fragmentary cross-sectional view of still a further embodiment of the invention;

FIG. 21 is a fragmentary view showing the free fall device of FIG. 20 in locked position; and FIG. 22 is a partial view of the embodiment with the parts partly disassembled.

DESCRIPTION OF THE PREFERRED EMBODIMENTS

FIGS. 1, 3, 4, 5 and 6 disclose the general assembly of U.S. Pat. No. 3,801,813 to illustrate a form of high mast lighting, cable hoisting and locking assembly with which the instant invention can be used and the description of these figures follows the disclosure thereof made in said patent to the extend necessary to understand the functions. FIGS. 2 and 7 through 22 are directed to the improvements of this invention which can be used with high mast lighting and other hoisting installations where similar safety problems occur such as the suspension of advertising signs and the like.

Figure 1:
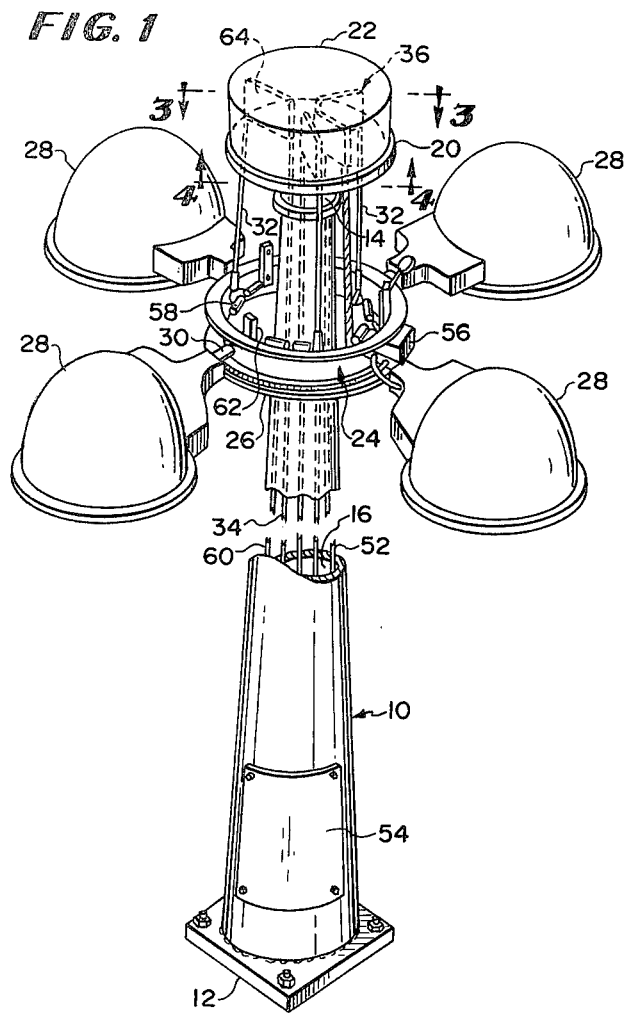
FIG. 1 is a perspective broken-away fragmentary view of a combination hollow mast street light carrying unit and apparatus for raising and lowering the same and into which the various features of the instant invention are to be incorporated, the light carrying unit being in a position below its normal uppermost position.
Figure 3:
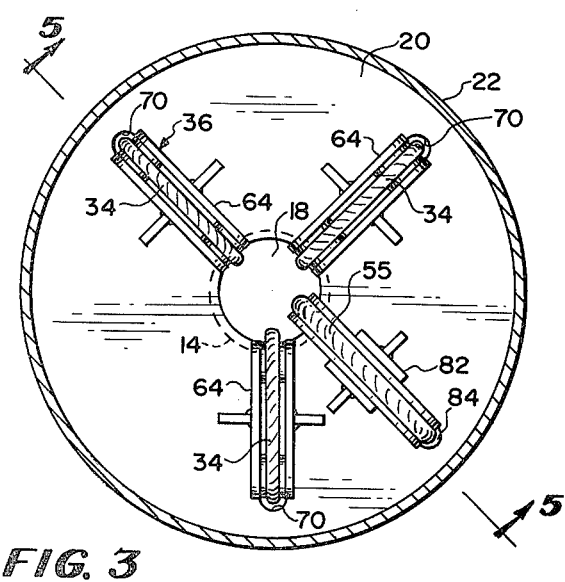
FIG. 3 is a horizontal sectional view through the pulley containing enclosure at the top of the mast, taken along section line 3—3 of FIG. 1.
Figure 2:
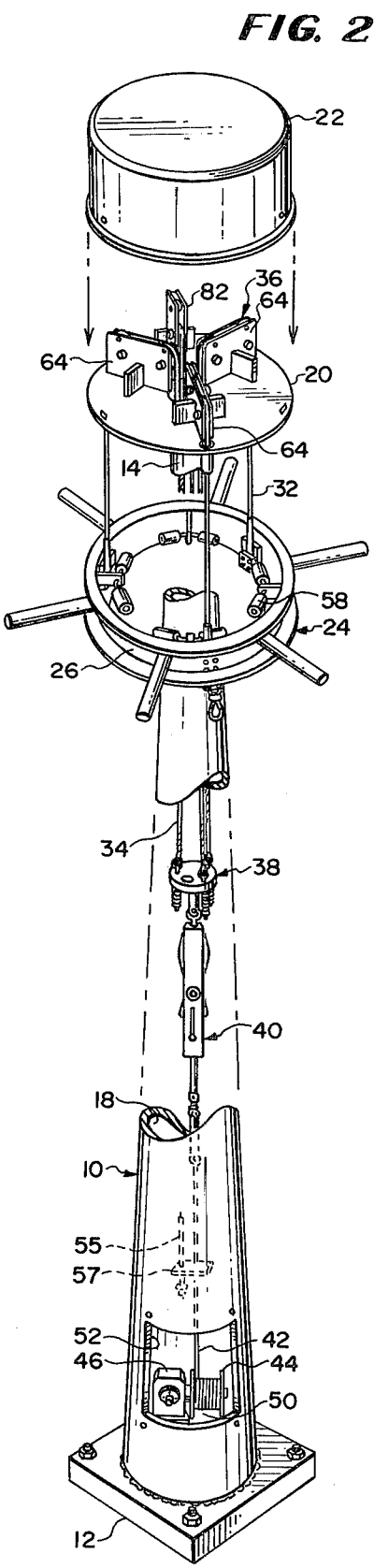
FIG. 2 is a fragmentary view, of the general assembly showing the capstan etc with the lighting pulling cable supporting the load of the fixtures.

Referring to FIGS. 1 and 2, there is shown the hollow mast 10 having a flanged base 12 anchored in any suitable manner to a supporting concrete bed or the like and a head portion 14 at the top of the mast. The mast 10 is tubular, has an inside wall 16 which can have any configuration e.g. round, oval or hexagonal and gradually tapers, being higher in diameter at the bottom and of smaller diameter at the top. The mast 10 is of standard construction and composed of structural steel or high strength alloy or the like. The wall 16 defines the interior space 18 which extends from the base 12 to the support plate 20 projecting horizontally from the head portion 14 of the mast.

The dome-shaped enclosure or cap member 22 is provided at the top of the tower and houses the pulleys or capstan assembly which will be described. The dome 22 is affixed at its periphery to the support plate 20 and both members are centered at the top of the mast 10. Also supported by the mast is the light carrying unit 24 which in the case where a number of lights is to be carried is in the form of a channel or luminaire ring that encircles and is spaced from the outside of the mast. Preferably, the unit 24 includes a ring-shaped channel 26 supporting at different points thereabout the mast reflector and light assemblies 28 affixed by the tubular brackets 30.

The upper end portions 32 of the cables 34 are connected to the frame 26 at three equally spaced balance points and extend upwardly therefrom where they pass over the capstan assembly 36 (to be described in greater detail) supported on the support plate 20. From the capstan assembly the cables 34 are trained down through the space 18 in the mast 10 to the shock absorbing cable holder 38. The cable holder 38 is in turn connected to the safety device 40 (to be described) which as shown in FIG. 2 is connected at its bottom to the pulling cable 42, wound around the drum or winch 44 carried by the driven shaft of the gear box 46. The input shaft 47 (FIG. 8) of the gear box 46 is connectable with a drive motor not illustrated.

The gear box 46 and its drive motor are either detachably or permanently carried by the support plate 50 in the bottom of the mast. The mast has an opening 52 with a door or plate 54 opposite the gear box and windless arrangement so that these parts are accessible for either manual or motor drive. This winch assembly or gear box can include a slip clutch to prevent damage of the parts in the event of substantial opposition to the rotation of the winch. A power cable 55 extends upwardly from the junction box 56 and light assemblies, where it passes over one of the pulleys in the capstan downwardly to the base of the mast for suitable connection to a second junction box (not shown) to supply electrical power for the lighting fixtures. The power cable 55 can be readily disconnected from the junction box at the base of the mast so that the cable 52 can move up and down freely within the mast along with the cables 34. The power cable 55 is usually anchored to the pulling cable 42 at a point initially adjacent to the door 54 by a suitable cable holder 57 so that it trains along within the mast.

In FIGS. 1 and 2, the light carrying unit 24 is shown in a position where it is somewhat below its normal uppermost position immediately contiguous to the support plate 20 at the head portion of the mast. The light carrying unit 24 can be moved between an uppermost position, referred to as the lighting position and a fully lowered position adjacent to the bottom of the mast where the reflector and light assemblies 28 can be cleaned, repaired or the light units thereof replaced, by rotating the drum 44 of the windless unit or gear box 46 in one direction or the other, unless the light carrying unit 24 is otherwise held against such movement.

When the light carrying unit 24 is lowered to the bottom portion of the mast, the flexibility of the cables 34 makes it possible for the ring shaped frame to contact the mast 10. The rollers 58 are positioned and spaced on the inside of the frame 26 so that all of the rollers will simultaneously engage the outer surface of the mast when the light carrying unit is in its bottommost servicing position, where a fairly rigid lateral support for the light carrying unit is desired.

In a manner to be described, when the light carrying unit 24 is raised to the lighting position at the top of the pole, in accordance with said U.S. Pat. No. 3,801,813, support means on the light carrying unit and mast become interlocked and, when the light carrying unit is dropped slightly, this interlock supports the weight of the light carrying unit at the top of the mast 10 so that tension is removed from the cables 34. After the light carrying unit 24 has been returned to its fully raised position, the power cable 55 is reconnected to the appropriate terminals of the junction box in the bottom of the mast 10. While the interlocked support means may be operated in a number of ways, for minimum cost and reliability, such release is effected by means of a release cable 60 (FIGS. 1, 4 and 6) which extends through the space 18 in the mast 10 to a point at the bottom of the mast where it is accessible when the door 54 is open.

In the event the operator should fail to stop the rotation of the winch 44 when the light carrying unit 24 is returned to its uppermost position, the bumper members 62 (FIG. 6) carried by the light carrying unit will strike the support plate 20 causing the driving force to be decoupled from the winch. Normally the windless unit is operated so that the members 22 do not strike the support plate 20. So as to inform the operator when the unit 24 has reached its light carrying position at the top of the mast, a signal means, such as the reflective signal (not shown) described in U.S. Pat. No. 3,801,813, can be used which is biased at an angle when the unit 24 is down and is pivoted to the horizontal visible position when the unit 24 is in the proper lighting position.

Referring to FIGS. 2, 3, 5 and 6, it is seen that the support plate 20 carries the equally spaced upright housings 64 each of which rotatably support separate pairs of pulleys or sheaves 66 and 68 over which the support cables 34 are trained as they pass from the inner central space 18 and down through the apertures 70 into the sleeves 72 firmly secured to the ends 32 of each cable. The anchors 72 are held to the channel member 26 in any suitable manner such as by the blocks 73 and the anchor bolts 74. The apertures 70 are provided with the guides sleeves 76 to center the channel member 26 as it comes to its maximum height since they are adapted to receive the anchors 72 in telescoping relationship. The support plate 20 also carries the larger sheave 80 (FIG. 5) within the housing 82 at any selected position between the other sheave housings to receive the electrical power cable 55 which passes through the aperture 84 and thence to the junction box 56. The top inner portion 14 of the mast 10 is provided with a guide sleeve 86 against which the cables 34 may pass, however the power cable 52 is held in spaced relationship to this sleeve as shown in FIG. 5.

The aforesaid interlocking support means for the light carrying unit 24 may take a variety of forms and may comprise the arrangement shown in FIGS. 4 and 6 to include the three circumferentially spaced releasable shoulder-forming assemblies 88 secured to the support plate 20 about its perimeter. The assemblies 88 are similarly constructed and each assembly has the same essential parts, described in more detail in said U.S. Pat. No. 3,801,813, but amply illustrated in FIG. 6 to include the open-ended slide-forming housing 90 holding the shoulder-forming or detent member 92 and a downwardly facing cam-forming end member 94. The bottom of each slide member 92 is provided with a guide slot (not shown) to receive a screw through the housings 90 that limits the horizonal movement from the position shown in FIG. 6 where the front end projects radially outwardly of the housings 90 into the path of the upward movement of one of the bumper members 62 that extends upwardly from the ring member 26 and a retracted position where the member 92 is retracted out of the path of such movement. Each shoulder-forming member 92 has a reduced horizontally extending operating rod, projecting to the rear surrounded by a coil spring 96 bearing against the inner end of the housings 90. This biases the members 92 outwardly. The inner end of the release cable 60 is attached to the operating rod in any suitable manner such as by the connector 97. One of the spring-loaded detents or shoulder-forming slides is equipped with a winged portion 98, to which the flexible cables 100 (FIG. 4) are attached, and extend through the conduits 102 to the other two detents 92 that are suitably positioned on the plate 20. These detents are also spring-loaded and constructed of steel to perform their intended purpose.

Each bumper or extension member 62 has an aperture 104 positioned so that when the light unit carrying frame 26 is raised to the top of the mast, the apertures 104 of the member 62 will be brought opposite the shoulder-forming members 92 to receive the same. The upper edge portions 105 of the bumper members 62 will first engage the inclined surfaces 94, push the members 92 into their retracted positions where the upper ends of the bumper members 62 can pass above the shoulder-forming members 92 and when the frame 26 is raised to its uppermost position, the members 92 will simultaneously snap into the associated apertures 104 and support the weight of the lighting units. A slight reversal of the winch will bring the upper walls of the apertures 104 into this weight-supporting contact, as shown in FIG. 6. Simply by pulling the release cable 60, the members 92 are retracted and the weight is transferred to the cables 34. This is accomplished with some tension on the winch as will be described. An arcuate guide sleeve 106 can be used to train the release cable 60 around the corner from the space 18 to a radial path corresponding to the reciprocating axis of the detent 92, as shown in FIG. 6.

As previously described, the foregoing supportive cable assembly and weight-receiving shoulder-forming assemblies 88 which are described in more detail in said patent are used in cooperation and combination with the shock absorber or cable connector 38 and the safety device 40 which constitute additions to the assembly.

Figure 7:
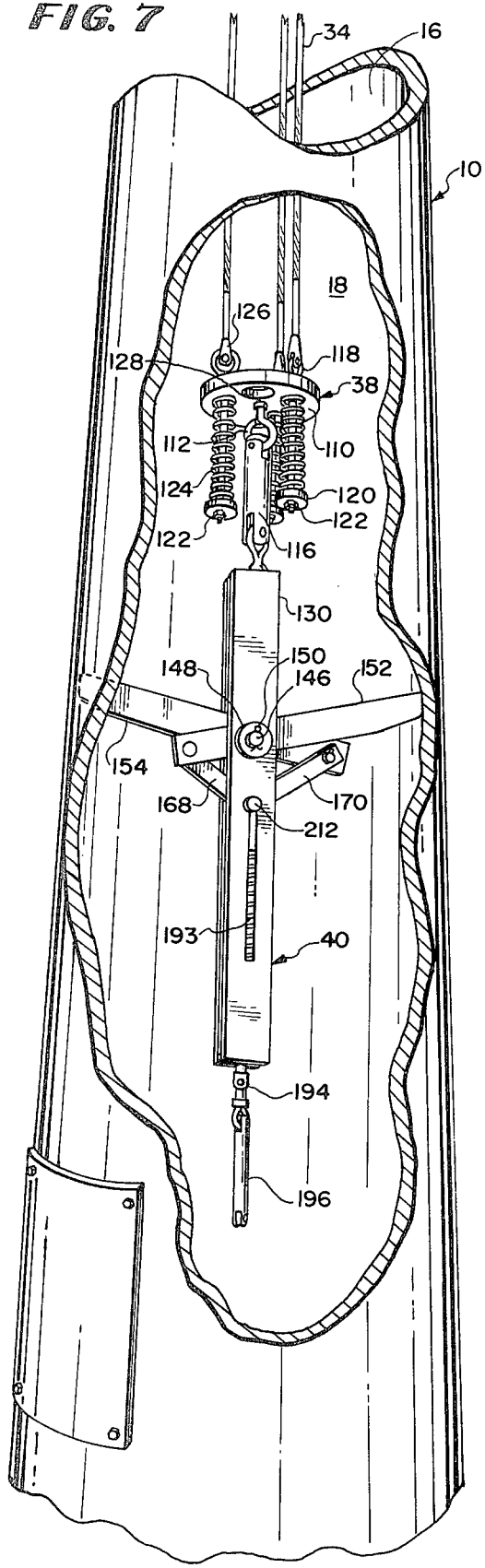
FIG. 7 is a fragmentary view of the bottom of the mast showing the position of the safety device in the locked position when the lighting fixtures are held at the top of the mast as shown in FIG. 6.
Figure 8:
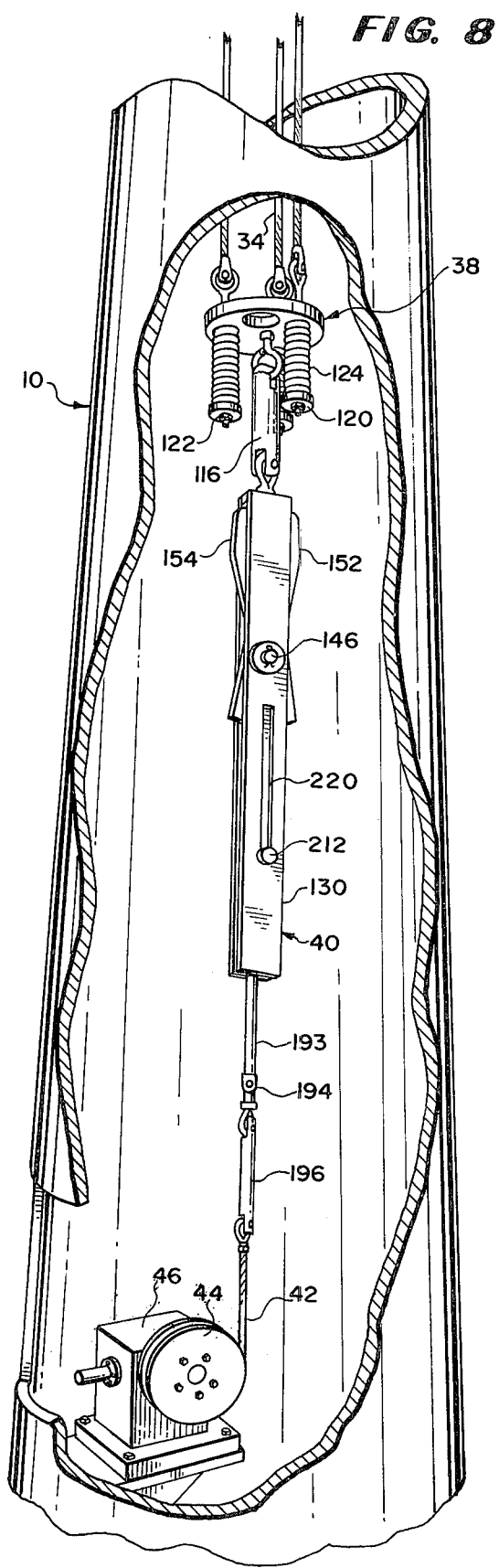
FIG. 8 is a fragmentary view of the bottom of the mast showing the pulling cable and winch in place with tension on the cable system as during raising or lowering operations.

Referring to FIGS. 7 and 8, the shock absorber 38 is shown to comprise a base plate 110 which can be flat and is preferably formed of steel and in the form of a disc. The shoulder eye bolt 112 is affixed to the bottom center of the plate and adapted to receive the releasable swivel coupling 116 having slotted ends adapted for engagement with eye bolt. The plate 110 is provided with three equally spaced bore holes (not shown) each receiving the elongated shoulder eye bolts 118 with their elongated shanks extending below the bottom surface of the plate 110. The eye bolts 118 are symmetrically spaced in relation to the center of the plate 110 and outwardly from the lower eye bolt 112 and are slidably received within said bore holes. At each lower end of the shanks of the eye bolts 118 there is provided a heavy steel washer 120 which is welded to the end thereof as by weldments 122 and each shank has a compression spring 124 thereabout which abuts against the bottom of the plate 110 at its top end and is retained at its bottom end by the washer 120. The three support cables 34 are each attached to one of the eye bolts 118 by a suitable cable connector 126. It is thus seen that any sudden pulling force between the link coupling 116 and the cables 34 is adequately cushioned by the springs 124 which are thereby compressed between the washers 120 and the plate 110 as the eye bolts reciprocate in relation to the plate 110. An aperture 128 is provided in the plate 110 through which to train the power cable 55 and the release cable 60, as desired, to keep these cables centered and out of the way of other working parts, such as the safety device 40.

The saftey device 40 of this invention (FIGS. 9 and 10 in particular) includes the elongated housing member 130 comprising the pair of side plates 132 and 134, the top and bottom walls 136 and 138 defining therebetween the space 140 to confine the working parts. The eye bolt 142 is affixed to the top wall 136, as by means of the nut 144 for attachment of the saftey device to the coupler 116. If desired, this mounting can include a swivel so that there is no tendency for the cables to become entangled.

The pivot pin 146 is retained transversely between the intermediate the lengths of the side plates 132 and 134 by bore holes (not illustrated) and is suitably retained at its outer ends by the washers 148 and cotter pins 150 as illustrated best in FIG. 7. A pair of locking arms 152 and 154 is pivotally mounted on the pin 146 at a point intermediate the ends thereof.

The locking arms 152 and 154 are of substantially equal total length and have rounded ends 156 and 158 and the tapered portions 160 and 162 which reduce their effective transverse width in the unlocked positions of FIGS. 9 and 10 so that they fit into the upper narrow portion 14 of the mast 10 and allow the maximum up and down movement of the cables 34. The locking arms 152 and 154 are constructed of steel, as are the other parts of the locking device 40, for maximum strength and are carried by the pin 146 in juxtaposition (over-lapping relationship) to each other and substantially fill the space 140 between the side plates 132 and 134.

The lower ends 164 and 166, respectively, of the locking arms are each pivotally connected to a link such as the linkages 168 and 170 by means of the pins 174 and 176 which have their lower ends extending into the transverse slot 177 and pivotally connected to the common pivot provided by the pin 178 carried by the reciprocatable piston or follower member 180. The piston 180 is adapted to reciprocate in the space 140 between the side plates 132–134 in guided relationship along the interface 181.

The links 168 and 170 are formed of narrower bar stock than the locking arms 152–154. The pin 176 attaches the link 170 to the locking arm 154 and has its enlarged head end 182 counter-sunk within the containing bore so that the outer surface is flush with the side plate 132, this relationship being shown by the broken lines in FIG. 9. The other end of the pin 176 is retained by the washer 184 and the cotter pin 186. The pin 174 not visible in FIG. 9 similarly attaches the link 168 to the locking arm 152 in a reverse position. The links 168 and 170 are flush against each other along their inner surfaces in the same manner as the locking arms.

The follower or piston 180 (see FIGS. 11 and 12 also) carries the operating rod 190 from its bottom center which can be affixed thereto in any manner as indicated by the threaded engagement at 192 (FIG. 10). The rod 190 extends through the main operating compression spring 193, (held between the bottom of the piston follower 180 and the top of the plate 138) through a central guide bore in the bottom plate 138 and has the pin coupler 194 (FIGS. 7 and 8) at its end for attachment to the cable coupler 196. The cable coupler 196 is in turn releasably connectable to the pulling cable 42 operated by the winch 44, at the bottom of the mast.

In one embodiment the housing 130, in this instance the side wall 132, defines on its inside surface a series of inwardly facing transverse notches 198 each having a square shoulder 200 at the bottom and an inwardly and upwardly sloping cam surface 202. The notches 198 are of the same height and extend in equally spaced sequence upwardly along the area opposite the pivots 174–176. The pin 178 in the piston follower 180 is counter-bored at 204 (FIG. 12), which counter-bore opens against the inside surface 206 of the side plate 132, the same surface that carries the notches 198 thereabove. A second open-ended bore 208 meets the counter-bore 204 on the other end of the pin 178. These counter-bores contain the latch pin 210 having an enlarged knurled knob 212 at one end, the intermediate shank 214 which is slidably engaged by the bore 208 and the enlarged catch head 216 at the other end, opposed to the surface 206. The bore 204 houses the compression spring 218 which constantly biases the latch pin 210 against the surface 206. The notches 198 are machined across the inside face 206 of the side plate 132, although these notches need only be opposite the latch pin 210 in one position of the piston follower 180 and extend vertically along the upper path of its travel.

The side plate 134 has the elongated slot 220 (best shown in FIG. 8) which receives the shank 214 of the latch pin 210 in vertical sliding relationship. The top of the slot 220 is indicated at 222 in FIG. 9 and the bottom of the slot is indicated at 224 in FIG. 11. The slot 220 can be longer than the path of travel of the pin 178 on which the links 168 and 170 are pivoted.

It is apparent from the foregoing description that, discounting the functions of the latch pin 210 and the ratchets or notch arrangement 198, the compression spring 193 normally urges the follower 180 upwardly in the housing 130, guided by the side walls 132–134 and moves or snaps the locking arms 152 and 154, through the spreading action of the links 168–170, from the full line position of FIG. 1 to the broken line position illustrated.

It is to be observed from FIG. 9 that the locking arm 152 and its operating link 168 are in spaced parallel planes, as are the locking arm 154 and its operating link 170, but the link 170 and the locking arm 152 as well as the link 168 and the locking arm 154 are coplanar or overlap. Thus, as the follower piston 180 is urged or snaps upwardly, the link 168 will contact the under edge of the locking arm 154 at 230 (FIG. 10) and the link 170 will contact the link 152 at 232 and prevent further movement at these parts. This position represents the widest diametric span of the locking arms and is attained before the arms have reached a straight line or 180° transverse relationship with respect to their common pivot pin 146. Thus, any inward force on the ends of the locking arms or downward force on the operating rod 190, under these conditions, would cause the arms to collapse again to the full line position.

Considering now the function of the latch pin 210, in the down position of the follower 180, the spring 193 is fully compressed and the latch pin 210 is retracted or in the unlatched position with the spring 218 urging the latch head 216 against the planer surface 206 of the side wall 132 as shown in FIG. 11. Now as the follower piston 180 is urged or snaps upwardly due to international or accidental release of the pulling force on the rod 190 the catch head 216 travels upwardly to the region of the ratchet or notch arrangement 198, cams successively over the notches and locks into the last or any intermediate notch (as in FIG. 12) to lock the arms 152–154 in their extended radial position, wherein their rounded ends 56–158 contact or are positioned to contact and lock within the inner surface 16 of the mast 10 as shown in FIG. 7 at 234.

In the event these functions take place suddenly, the shock absorbing coupler 38 reduces the impact on the parts. The shock-absorber coupler 38 can be omitted from the assembly for some installations. Under dynamic conditions where the weight of the lighting fixture 28 is on the cables 34, release of the catch 218, by pulling it out of engagement with a notch, will not release the arms. Only the simultaneous release of the catch 218 and the application of a downward pulling force sufficient to collapse the spring 193 and take the weight of the lighting fixtures will allow movement of the assembly in relation to the mast.

Normally, however, the assembly is locked in a static condition and not under any strain since the upper locking mechanism 92 between the mast 10 and the ring 26 takes the weight of the lighting fixtures from the cables 34 and the locking device merely hangs in open readiness as shown in FIG. 7. When it is necessary to lower the lighting fixtures the pulling cable 42 is attached to the cable link 196 and power applied to the input shaft 47. As the pulling force is gradually applied the catch 218 is released until the locking arms 152–154 are retracted and the spring 193 is compressed to its limit. This amount of force is less than that required to lift the light assembly and the upper supporting catch means 92 are still engaged. As the pulling force of the pulling cable from the winch 44 is further increased, the weight of the lighting assembly is taken up on the cables 34. The release cable 60 is then pulled and the motor drive reversed as the pulling cable is paid out to gradually lower the lighting fixtures. Should the power fail and the pulling force cease, the follower piston 180 immediately snaps upwardly and the locking arms engage and lock at any position along the tapered wall of the mast.

Since the link 168 on one side of the assembly and the links 170 on the other side are in the plane of their respective locking arms, these members interengage or abut along the junctures 236 and 238 to stop the collapse of the arms beyond the limits shown in FIG. 10.

Several alternative constructions can be used in the fabrication of parts for the assembly of this invention. More than three main suspension cables 34 can be used, although a three-point suspension as shown, is preferred. The housing 130 can be formed from a tubular member and the longitudinal opening 140 defined therein by opposed slots in the side wall. The end walls can be formed by an internally threaded cap that engages over the ends. In this instance, the ratchet means 198 can comprise a separate elongated piece welded to the inside surface of the tubular member. The locking arms 152 and 154 need not be contiguous but for convenience and compactness of structure as well as lateral support, these members are mounted on the pin 146 in the manner shown. Likewise, the spreading link means 168–170 may be spaced and otherwise pivoted both to the locking arms and the follower piston, but the construction shown offers the greatest strength with the least amount of material.

The latch pin 210 can be mounted separate from the pivot pin 178, as desired, for example below this pin in the base of the follower 180.

Figure 13:
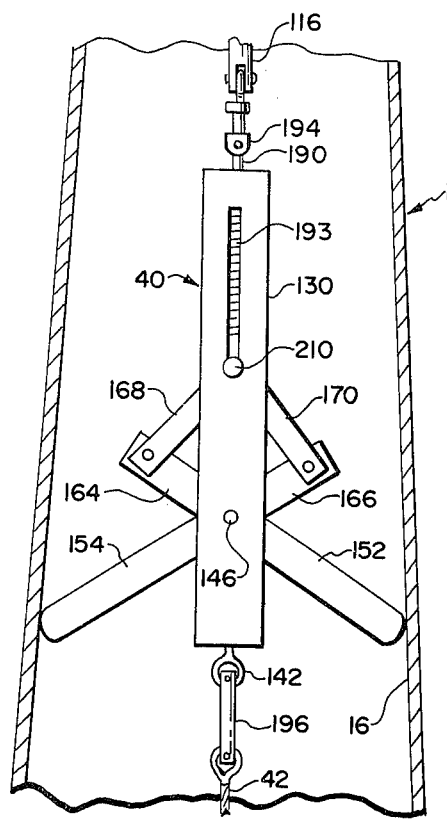
FIG. 13 is a fragmentary view of the bottom of the mast showing the free feel device of FIGS. 7 and 8 in use in an up-side-down position.
Figure 14:
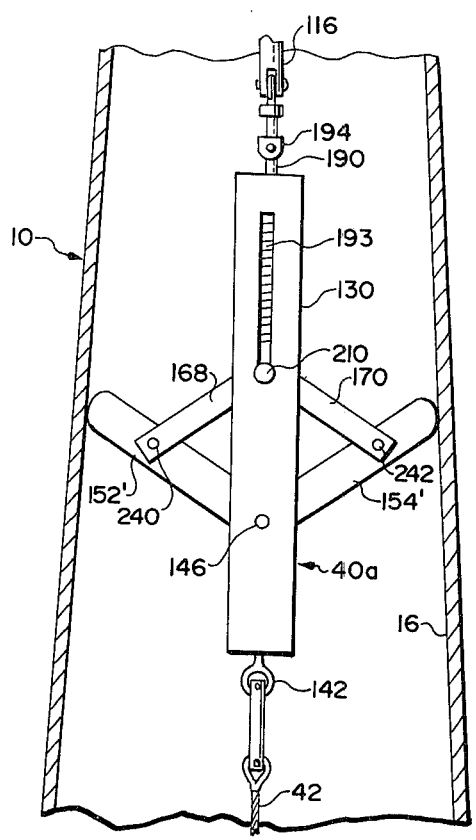
FIG. 14 is a fragmentary view of the bottom of the mast showing a modified free fall device wherein the linkage means are attached intermediate the ends of the locking arms and the actuating means as on the top end of the housing.
Figure 15:
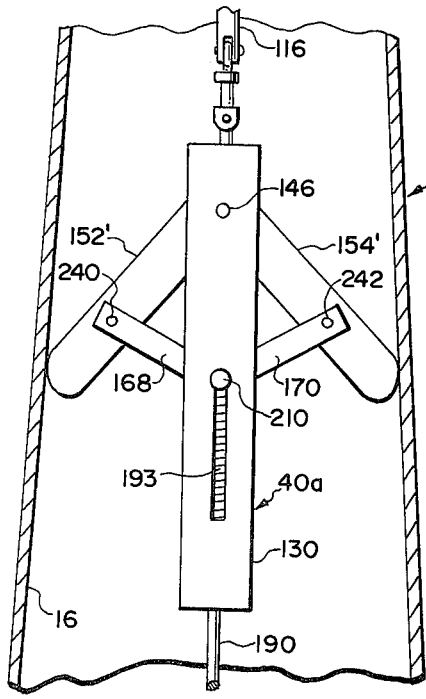
FIG. 15 is a fragmentary view of the bottom of the mast showing the modified free fall device of FIG. 14 in use in an up-side-down position.

The locking device 40 can also be used in the reverse position from that shown in FIGS. 7 and 8, as illustrated in FIG. 13. A modified form of the locking device 40a is shown in FIGS. 14 and 15, the former being the reverse of the latter. In FIGS. 14 and 15 the locking arms 152' and 154' are modified in that the extended ends 164 and 166 are eliminated and the spreading links 168–170 are attached to the intermediate pivots 240–242. Also, the spring biased follower and latch pin 210 are above the main pivot pin 146, as in FIG. 13. This places the locking arms 152 and 154' in the same angular or upwardly spreading relationship as that shown in FIG. 10 but with the latch means at the top of the housing. FIG. 15 has the same parts but is attached upside down in the mast.

Figure 16:
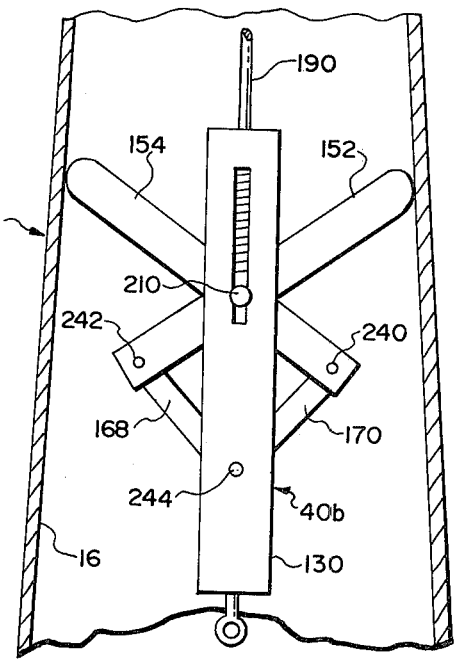
FIG. 16 is a fragmentary view of the bottom of the mast showing a modified free fall device like that shown in FIGS. 7 and 8 wherein the movability of the axes is reversed.

In FIG. 16 the safety device 40b has been further modified to place the links 168 and 170 at the bottom of the housing 130 where they are pivoted to the fixed pin 244 between the side walls and have their upper ends pivoted to the short shanks of the locking arms 152 and 154 by the pivots 240 and 242. The locking arms are pivoted to the movable latch pin 210. FIG. 17 shows the free fall device 40b used in a reverse position within the mast 10.

The internal parts, that is the operating rod 190, the compression spring 193, the follower 180 and the pin 178 with associated latch means 210 and ratchet means 198 are the same in these embodiments of FIGS. 13 to 17 as have been previously described. The parts making up the embodiments of FIGS. 9, 10, 11 and 12 can be fabricated so as to be assembled, as desired, into the arrangements of FIG. 16. Only slight changes in the locking arms and the linkage are necessary to incorporate the embodiment of FIG. 14.

In FIGS. 18 and 19 the latch of a modified free fall device 40c is shown wherein the housing 130a is modified to a single flat wall member to which, although not illustrated, the top eye bolt 142 can be affixed as well as the fixed pivot 146 holding the locking arms 152 and 154 in juxtaposition against one side thereof. The links 168 and 170 are attached as before to the short shanks 164 and 166 of the locking arms by means of the pivot pins 174 and 176 as previously described.

However, in this embodiment the follower 180a is modified and in the form of a plate overlapping the side edges of the slot 220 which has the ratchet teeth 198 therealong on each side edge on the back side of the flat wall member 130a. The operating rod 190 attaches to the bottom edge of the follower plate 180a and extends to the bottom of the flat wall member 130a where is passes in guided relationship through a suitable boss (now shown), which serves as the bottom seat for the compression spring 193 encompassing the operating rod.

The follower 180a receives the combination latch and pivot pin 252 in a suitable bore to which the links 168 and 170 are pivoted, the latter being flush against the face of the modified follower 180a. The pin 252 extends through the slot 220 in guided relationship and has the fixed head 254 with the lugs 256 and 258 extending from either side to engage the ratchet 198 machined into or otherwise affixed along each side of the slot 220. The other end of the pin 252 has the removable head 260 retaining the biasing spring 262 pressing against the outermost link 168. The latch pin 252 and its lugs 256–258 cam over the ratchet 198 in an upward direction and are prevented from retracting in the same manner as the latch head 216 (FIG. 11). The latch pin 252 can be operated by pushing the head 260 or pulling the head 254 manually.

Referring briefly to FIGS. 20, 21 and 22, the parts corresponding to these previously described bear the same reference numbers. Thus, the top eye bolt 142 attached to the housing 130 and the modified locking arms 152a and 154a are pivoted between the side plates 132 and 134 by means of the fixed pin 146. At the bottom of the housing 130 the actuating rod 190 fits in guided relationship through the bottom plate 138.

The housing 130 has the spaced and opposed lower side walls 260 and 262 affixed thereto by the pins or bolts 264 and defining the longitudinal channel or opening 266 that houses the modified follower 180b in sliding relationship with the compression spring 193 positioned around the actuating rod 190 and impinging between the bottom of the follower and the top of the plate 138. The follower 180b has the ratchet 198 along one side and opposed to the inside surface 268 of the side plate 262. This plate has a suitable blind bore 270 near the top edge housing the spring 272 urging the detent 274 and its head 276 into the ratchet 198. The detent has the knurled knob 278 for grasping by hand to release the detent.

At the top of the follower 180b a pair of spaced bosses 280 is provided with the parallel and aligned bore holes 282 to receive the pins 284. The modified locking arms 152a and 154a have the elongated slots 286 in their end portions, below the pivot 146, which are at an angle to the longitudinal axes of the locking arms and at an angle to each other when the locking arms are positioned on the pin 146. As illustrated the pins 284 are carried by the bore holes 282 between the bosses 280 and engage the slots 286 of the locking arms in a sliding relationship. Thus the upward movement (or downward if the free fall device 40d is used upside down) of the follower 180b spreads the slotted ends and pivots the locking arms to the locked position shown in FIG. 21 and at the same time the ratchet 198 cams over the detent 274 until the detent 274 registers with one of the topmost ratchets 198. In this position the locking arms cannot retract and contact the mast 10 diametrically across the inside surface 16. The locking arms can be provided with indentation 290 to provide sufficient clearance as they pivot outwardly against the pins 284. The bore for the fixed pin 146 is illustrated at 292. Additional clearance for the pin 146 is provided by the notches 294 in the top of the bosses 280. The ends 296 of the modified locking arms are flat and may contain roughening notches to engage the inner surface 16 of the mast 10.

The free fall device of this invention can be variously dimensioned to accommodate masts of different inside diameters. The device of this invention includes a pair of pivotally mounted locking arms mounted to pivot into a diametric position in combination with an actuating means biased to constantly urge the locking arms into said position and releasable catch means associated with the actuating means or with the pivotal axis of the locking arms to prevent the retraction of the locking arms. Where the actuating means is released, either of the pivotal axes can be moved toward the other to cause the locking arms to spread and the latch to engage to prevent retraction.

What is claimed is:

1. A free-fall safety device for use at the end of cable means supporting a load from the top portion of a hollow mast having an upwardly tapering inside wall, said cable means passing over a pulley at said upper portion and trained downwardly through the mast to a lower position thereof comprising:

an elongated housing member defining at least one side wall.

means at one end of said housing member for attachment to the downwardly trained end of said cable means;

a pair of locking arms pivotally mounted on a first pivot axis contiguous to said side wall and adapted to pivot thereon into a diametric position with extended ends engageable against said tapering inside wall of said hollow mast to anchor the downwardly trained end of said cable means;

linkage means connected at one end to a second pivot axis contiguous to said side wall and connected at the other ends to said locking arms;

said first and second axes being coplanar and longitudinally spaced along said side wall of said housing member with one of said axes being fixed to said side wall and the other being guidably movable laterally in relation to said fixed axis along the length of said side wall;

means biasing said movable axis laterally toward said fixed axis whereby said linkage means pivots said locking arms into said diametric position; and releasable catch means associated with said movable axis to prevent the retraction of said locking arms from said diametric position.

2. A free-fall safety device in accordance with claim 1 in which:

said locking arms are pivoted upon said first pivot axis at points intermediate their ends whereby each locking arm includes a extendable end and a shorter shank portion;

said linkage means comprises a pair of link members each pivoted at one end to said second pivot axis and having their other ends each pivotally connected to one of said shorter shank portions of said locking arms;

said locking arms and said link members being in overlapping contiguous relationship to each other on their respective axes whereby as said axes are moved laterally closer to each other by said biasing means the link of one locking arm is in the plane of the other locking arm and the other ends of said link members contact the side edge of said locking arms to limit the diametric position of said extendable ends to less than 180°.

3. A free-fall safety device in accordance with claim 1 in which:
said side wall includes an elongated slot;
said movable axis extends through and is guided at one end by said slot;
a follower is connected to said movable axis for engagement by said biasing means; and
said releasable catch means includes a ratchet in said side wall extending along said slot with a spring-load pin carried by said follower, said pin having a latch member adapted to engage said ratchet and cam therealong as said movable axes is moved toward the other axis and is prevented from moving in the reverse direction.

4. A free-fall safety device in accordance with claim 3 in which:
an actuating rod is connected to said follower for connection to a pulling cable whereby upon the release of said latch member and the application of a pulling force upon said pulling cable said locking arms are retracted and said load at the top of the mast can be lowered.

5. A free-fall saftey device for use at the end of cable means supporting a display frame at spaced points around a hollow mast having an upwardly tapering inside wall, said cable means passing over pulleys at the upper portion thereof and trained downwardly through the mast to the lower portion thereof comprising:
an elongated housing member defining a pair of spaced opposing side walls with an elongated transverse opening therebetween;
means at one end of said housing member for attachment to the downwardly trained end of said cable means;
a pair of locking arms pivotally mounted on a first pivot axis between said spaced side walls and adapted to pivot thereon and extend into a diametric position with their extended ends engageable against said tapering inside wall of said hollow mast to anchor the downwardly trained end of said cable means;
linkage means connected at one end to a second pivot axis between said spaced side walls and connected at the other end to said locking arms;
said first and second pivot axes being co-planar and longitudinally spaced along said transverse opening in said housing member with one of said axes being movable laterally in relation to the other;
means biasing said movable axis laterally toward the other whereby said linkage means pivots said locking arms into said locked position; and
releasable catch means operable to prevent the retraction of said locking arms from said locked position.

6. A free-fall saftey device in accordance with claim 5 in which:
said second axis comprises the movable axis and is carried in guided relationship from a follower member slidably mounted in said transverse opening between said side walls of said housing member;
an operating rod is connected to said follower member, said operating rod extending from the other end of said housing member for connection to a pulling cable; and
said biasing means is operable between said other end of said housing and said follower member to urge said locking arms into said extended diametric position whereby said locking arms are retractable upon release of said catch means and the application of a pulling force through said pulling cable sufficient to overcome said biasing means and take the weight of said display frame.

7. A free-fall safety device in accordance with claim 5 in which:
said locking arms are pivotally mounted on said first pivot axis at a point intermediate the ends thereof whereby each locking arm includes an extendible end and shorter shank portion;
said linkage means comprises a pair of link members each pivoted at one end to said second pivot axis and having their other ends each pviotally connected to one of said shorter shank portions of said locking arms;
said locking arms and said link members being in overlapping contiguous relationship to each other whereby the diametric position of said extendable ends is less than 180°.

8. A free-fall safety device in accordance with claim 5 in which:
said second axis comprises the movable axis and is carried in guided relationship from a follower member slidably mounted in said transverse opening between said side walls of said housing member;
said means at one end of said housing member for attachment to the downwardly trained end of said cable means comprises an operating rod extending from said one end of said housing and connected at the other end to said follower member;
said biasing means is operable between said one end of said housing to urge said locking arms into said extended diametric position;
means are provided at the other end of said housing for attachment to a pulling cable whereby said locking arms are retractable from said diametric position upon release of said catch means and the application of a pulling force through said pulling cable sufficient to overcome said biasing means and take the weight of said display frame.

9. A free-fall safety device in accordance with claim 5 in which:
said locking arms are each pivoted at one end to said first axis for extension outwardly and oppositely into an annular diametric position; and
said second axis comprises the movable axis;
said linkage means comprises a pair of links pivotally connected at one end to said locking arm at a point intermediate the ends thereof and having their other ends connected to said second pivot axis.

10. A free-fall safety device in accordance with claim 5 wherein:
said cable means comprises at least three cables trained in spaced parallel relationship from the top of said mast;
said attachment at one end of said housing member includes a shock absorber attachable to said cables;
said shock absorber comprising a plate member with means central to the underside for attachment to said safety device;
said shock absorber including at least three bore holes spaced radially from said central attachment means and substantially equally spaced circumferentially thereabout;

an eye bolt having an elongated shank portion positioned downwardly through each of said bore holes, each of said eye bolts being attached to one of said cables; and compression spring members between the underside of said plate member and the ends of the shanks of each of said eye bolts.

11. A free-fall safety device in accordance with claim 5 in which:

said first axis comprises the movable axis and is carried in guided relationship from a follower member slidably mounted in said transverse opening between said side walls of said housing member;

said means at one end of said housing member for attachment to the downwardly trained end of said cable means comprises an operating rod extending from said one end of said housing and connected at the other end to said follower member;

said biasing means is operable between said one end of said housing to urge said locking arms into said extended diametric position; and means are provided at the other end of said housing for attachment to a pulling cable whereby said locking arms are retractable from said diametric position upon release of said catch means and the application of a pulling force through said pulling cable sufficient to overcome said biasing means and take the weight of said display frame.

12. A free-fall safety device for use at the end of cable means supporting a load from the top portion of a hollow mast having an upwardly tapering inside wall, said cable means passing over a pulley at said upper portion and trained downwardly through the mast to a lower position thereof comprising:

an elongated support member defining at least one side wall;

means at one end of said support member for attachment to the downwardly trained end of said cable means;

a pair of locking arms pivotally mounted on a pivot axis contiguous to said side wall and adapted to pivot thereon into a diametric position with their extended ends engageable against said tapering inside wall.

actuating means connected to said locking arms;

said actuating means being biased to constantly urge said locking arms into said diametric position; and releasable catch means associated with said actuating means to prevent the retraction of said locking arms from said diametric position whereby said downwardly trained end of said cable means is prevented from any sudden upward movement and the weight of said load is sufficient to overcome said bias and retract said locking arms for lowering of said load.

13. A free-fall safety device for use at the end of cable means supporting a lighting fixture at spaced points around a hollow mast having an upwardly tapering inside wall, said cable means passing over pulleys at the upper portion thereof and trained downwardly through the mast to a lower portion thereof, said mast including a releasable support means to take the weight of said lighting fixture when same is pulled to the upper portion of said mast comprising:

an elongated housing member defining a pair of spaced opposing side walls with an elongated transverse opening therebetween;

means at the top end of said housing member for attachment to the downwardly trained end of said cable means;

a pair of locking arms pivotally mounted on a first pivot axis fixed between said spaced side walls at a point intermediate the ends thereof to define an upwardly extendible portion for each locking arm and a short downwardly directed shank portion on opposite sides of said first pivot axis;

said locking arms being adapted to pivot thereon and engage the ends of said extendible portions in diametric locked position aainst said tapering inside wall of said hollow mast to anchor said cable means;

a pair of links each pivotally mounted at one end to a second pivot axis below said first pivot axis and each being pivotally connected at their other ends to the respective shorter shank portions of said locking arms;

a follower member slidably mounted within said elongated opening in said housing member and carrying said second pivot axis therealong in vertical guided relationship;

an operating rod connected to said follower member and extending in reciprocable relationship through the bottom end of said housing member;

means biasing said follower member upwardly whereby the one ends of said pair of link members are urged upwardly and their other ends pivot said locking arms into said diametric locked position; and releasable catch means associated with said follower member and adapted to prevent the retraction of said locking arms from their diametric locked position whereby the application of a pulling force upon said operating rod is operable upon release of said support means at the top portion of said mast and release of said catch means to retract said locking arms from their locked position against said biasing means as the weight of said lighting fixture is taken up by pulling cable and thereby allow the lowering of same along said mast.

14. A free-fall safety device in accordance with claim 13 in which:

a vertical guide slot is provided in one of said side walls in the plane of said first and second axes;

the other of said side walls includes a series of transverse ratchet teeth on its inside surface extending along and opposite said guide slot;

said release catch means comprises a spring-loaded detent having a handle end thereof extending through said guide slot and the other end engagable with said ratchet teeth at selected position;

said ratchet teeth each having a square top shoulder and an inwardly cammed lower shoulder whereby said other end of said detent is adapted to cam over and above each tooth in succession as said follower.

15. A free-fall saftey device in accordance with claim 13 wherein:

said cable means comprises at least three cables trained in spaced parallel relationship from the top of said mast;

said attachment means at one end of said housing member includes a shock absorber attachment to said cables;

said shock absorber comprising a plate member with a central eye bolt on the underside for attachment to said safety device;

said shock absorber including at least three bore holes spaced radially from said eye bolt and substantially equally spaced circumferentially thereabout;

an eye bolt having an elongated shank portion positioned downwardly through each of said bore holes, each of said eye bolts being attached to one of said cables; and compression spring members between the underside of said plate member and the ends of the shanks of each of said eye bolts.

16. A free-fall safety device for use at the end of cable means supporting a lighting fixture at spaced points around a hollow mast having an upwardly tapering inside wall, said cable means passing over pulleys at the upper portion thereof and trained downwardly through the mast to a lower portion thereof, said mast including a releasable support means to take the weight of said lighting fixture when same is pulled to the upper portion of said mast comprising:

an elongated plate member having planar side walls with a guide slot extending longitudinally thereof;

means at the top end of said plate member for attachment to the downwardly trained ends of said cable means;

a pair of locking arms pivotally mounted intermediate their ends on a first pivot axis above the upper end of said slot to define an outwardly extendable portion and downwardly extending shank portion for each locking arm on opposite sides of said first pivot axis;

said locking arms being adapted to pivot thereon and engage their extendable portions in diametric locked portion against said tapering inside wall of said hollow mast to anchor said cable means;

a follower member overlapping said guide slot and carrying a spring-loaded latch pin extending through said slot in vertical guided relationship;

an operating rod connected to said follower member and extending in reciprocable relationship along and beyond the bottom of said plate member;

a pair of links each pivotally mounted at one end on said latch pin and each being pivotally connected at their outer ends to the respective shorter shank portions of said locking arms.

means carried by the bottom end of said plate member biasing said follower member upwardly whereby the one ends of said pair of links are urged upwardly and their other ends pivot said locking arms into said diametric locking position;

said latch pin having a head end riding along said slot on the side of said plate member opposite said follower member; and a lug member on said head end adapted to cam over said ratchet as said follower is urged upwardly by said biasing means and be prevented from retracting downwardly along said ratchet to maintain said locking arms in their diametric position whereby the application of a pulling force upon said operating rod is operable upon release of said support means at the top portion of said mast and release of said latch pin to retract said locking arms from their locked position against said biasing means as the weight of said lighting fixture is taken up by said pulling cable and thereby allow the lowering of same along said mast.

17. A free-fall safety device for use at the end of cable means supporting a lighting fixture at spaced points around a hollow mast having an upwardly tapering inside wall, said cable means passing over pulleys at the upper portion thereof and trained downwardly through the mast to a lower portion thereof, said mast including a releasable support means to take the weight of said lighting fixture when same is pulled to the upper portion of said mast comprising:

an elongated housing member defining a pair of spaced opposing side walls with an elongated transverse opening therebetween;

means at the top end of said housing member for attachment to the downwardly trained end of said cable means;

a pair of locking arms pivotally mounted on a first pivot axis fixed between said spaced side walls at a point intermediate the ends thereof to define an upwardly extendible portion for each locking arm and a short downwardly directed shank portion on opposite sides of said first pivot axis;

said locking arms being adapted to pivot thereon and engage the ends of said extendible portions in diametric locked position against said tapering inside wall of said hollow mast;

a slotted opening in each of said shank portions of said locking arms and extending transverse the longitudinal axes thereof;

a second pair of opposed spaced lower side walls at the bottom of said housing member defining an elongated enclosure above said bottom end of said housing;

a follower member slidably mounted in said elongated opening and between said second pair of opposing lower side walls;

said follower member having a series of ratchet teeth along one side adjacent one of said lower side walls and a pair of spaced bosses at the top thereof receiving the shank portions of said locking arms therebetween;

a pair of pins carried by said bosses, one of said pins engaging the slotted opening in one of locking arms and the other of said pins engaging the slotted opening of the other of said locking arms;

an operating rod connected to said follower member and extending in reciprocable relationship through the bottom end of said housing member;

means biasing said follower member upwardly whereby slotted openings in the shank portions of said locking arms cam upon said pins and pivot said locking arms into said diametric locked position; and releasable catch means extending through said one lower side wall for engagement with said ratchet teeth to prevent the retraction of said locking arms whereby the application of a pulling force upon said operating rod is operable upon release of said support means at the top portion of said mast and release of said catch means to retract said locking arms from their locked position against said biasing means as the weight of said lighting fixture is taken up by said pulling cable and thereby allow the lowering of same along said mast.

* * * * *